United States Patent
Zhou et al.

(10) Patent No.: US 10,282,144 B2
(45) Date of Patent: May 7, 2019

(54) SYSTEM AND METHOD FOR DISTRIBUTED CELLULAR MANUFACTURING WITH OUTSOURCING GROUP CONSTRAINTS

(71) Applicants: Palo Alto Research Center Incorporated, Palo Alto, CA (US); Xerox Corporation, Norwalk, CT (US)

(72) Inventors: Rong Zhou, San Jose, CA (US); Sudhendu Rai, Fairport, NY (US); Minh Binh Do, Palo Alto, CA (US)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 0 days.

(21) Appl. No.: 13/799,019

(22) Filed: Mar. 13, 2013

(65) Prior Publication Data

US 2014/0268211 A1  Sep. 18, 2014

(51) Int. Cl.
*G06F 3/12* (2006.01)
*G06Q 10/06* (2012.01)

(52) U.S. Cl.
CPC ............ *G06F 3/1211* (2013.01); *G06F 3/126* (2013.01); *G06F 3/1275* (2013.01); *G06F 3/1285* (2013.01); *G06Q 10/06* (2013.01)

(58) Field of Classification Search
CPC ...... G06F 3/1212; G06F 3/126; G06F 3/1282; G06F 3/1211; G06F 3/1275; G06F 3/1285; G06Q 10/0631; G06Q 10/06
USPC .................................................. 358/1.1, 1.15
See application file for complete search history.

(56) References Cited

U.S. PATENT DOCUMENTS

| | | | |
|---|---|---|---|
| 7,125,179 B1 | 10/2006 | Rai et al. | |
| 7,126,717 B2 | 10/2006 | Jeyachandran et al. | |
| 7,430,056 B2 | 9/2008 | Rai et al. | |
| 2007/0019233 A1* | 1/2007 | Rai et al. ...................... | 358/1.15 |
| 2012/0140274 A1* | 6/2012 | Miyata .................. | G06F 3/1204 358/1.15 |
| 2012/0154866 A1* | 6/2012 | Chatow ................. | G06F 3/1211 358/1.15 |
| 2012/0314248 A1 | 12/2012 | Zhou et al. | |
| 2014/0085663 A1* | 3/2014 | Kavanappillil .... | H04N 1/00342 358/1.15 |
| 2014/0300926 A1* | 10/2014 | Rai ....................... | G06F 3/1211 358/1.15 |

* cited by examiner

*Primary Examiner* — Iriana Cruz
(74) *Attorney, Agent, or Firm* — Fay Sharpe LLP (57) ABSTRACT

To preserve job integrity and minimize multi-site coordination overhead such as shipping, a technique to control the amount of outsourcing activities in a distributed manufacturing environment is provided. This approach to multi-site scheduling allows outsourcing control for distributed cellular manufacturing based on scheduling constraints called outsourcing group constraints.

15 Claims, 5 Drawing Sheets

SYSTEM AND METHOD FOR DISTRIBUTED CELLULAR MANUFACTURING WITH OUTSOURCING GROUP CONSTRAINTS

BACKGROUND

Lean Document Production (LDP) offered by Xerox is a successful application of cellular manufacturing to the printing industry. LDP enhances print shop productivity by improving the layout of the print shop, eliminating the bottlenecks in its workflow, and reducing work-in-progress in areas of the print shop called cells.

BRIEF DESCRIPTION

In one aspect of the presently described embodiments, a system comprises a plurality of shops having resources and equipment to complete at least one type of job, and a multi-site scheduler configured to assign and schedule jobs to one of a home shop or a non-home shop, assignments to non-home shops based on a logical grouping of outsourceable jobs such that all jobs in the same group receive the same outsourcing treatment.

In another aspect of the presently described embodiments, the scheduler is further configured to determine a best shop for any logical grouping.

In another aspect of the presently described embodiments, the best shop is determined based on completion time.

In another aspect of the presently described embodiments, the multi-site scheduler is comprised of a plurality of parallel implementations of the multi-site scheduler.

In another aspect of the presently described embodiments, a method comprises defining a plurality of print shops having resources and equipment to complete at least one type of print job as part of a multi-site printing environment, and configuring a multi-site scheduler to assign and schedule print jobs to one of a home shop and a non-home shop, assignments to non-home shops based on a logical grouping of outsourceable jobs such that all jobs in the same group receive the same outsourcing treatment.

In another aspect of the presently described embodiments, the scheduler is further configured to determine a best shop for any logical grouping.

In another aspect of the presently described embodiments, the best shop is determined based on completion time.

In another aspect of the presently described embodiments, the method further includes implementing the multi-site scheduler as a plurality of parallel implemented multi-site schedulers.

In another aspect of the presently described embodiments, a method comprises defining a multi-site environment to include a plurality of individual shops as part of the multi-site environment, defining jobs to be processed within the multi-site environment as non-outsourceable jobs or as outsourceable jobs, assigning non-outsourceable jobs to their respective home shops, scheduling non-outsourceable jobs in their respectively assigned home shops, recording the resources needed to complete the respective non-outsourceable jobs in each of the home shops, determining outsourcing groups for the outsourceable jobs, assigning each outsourceable job to an outsourcing group, determining eligible shops for the outsourcing groups, pruning the eligible shops to determine a best shop for any one outsourcing group, tentatively scheduling the outsourceable jobs subject to resource availability, identifying a completion time for the outsourceable jobs tentatively scheduled in the non-home shops and the resource allocation to complete the outsourceable jobs, and formalizing scheduling and resource allocation.

DETAILED DESCRIPTION

According to the presently described embodiments, a system and method for managing scheduling of a plurality of jobs in a multi-site shop environment facilitates assignment and scheduling of jobs to one of a home shop or a non-home shop. Assignments to non-home shops are based on a logical grouping of outsourceable jobs such that all jobs in the same group receive the same outsourcing treatment, in at least one form. In some forms, a best shop for any logical grouping is determined based on, for example, completion time. Also, a plurality of parallel implementations of the multi-site scheduling technique described herein may be used.

For purposes of discussion but without limiting the concepts presented herein, a "print shop" refers to a grouping of printing resources. The print shop may be a freestanding entity such as a commercial printer or may be part of a corporation or other entity. A "print job" refers to a logical unit of work that is to be completed for a customer. For example, a request to make 1,000 copies of a book is a print job. Similarly, a request to make 100 copies of a single document is a print job. A production function can be any operation or processing step involved in the processing of the print job. For example, a production function can be black & white printing, color printing, scanning, or packaging. Therefore, the print job entails a document processing operation.

Figure 1:
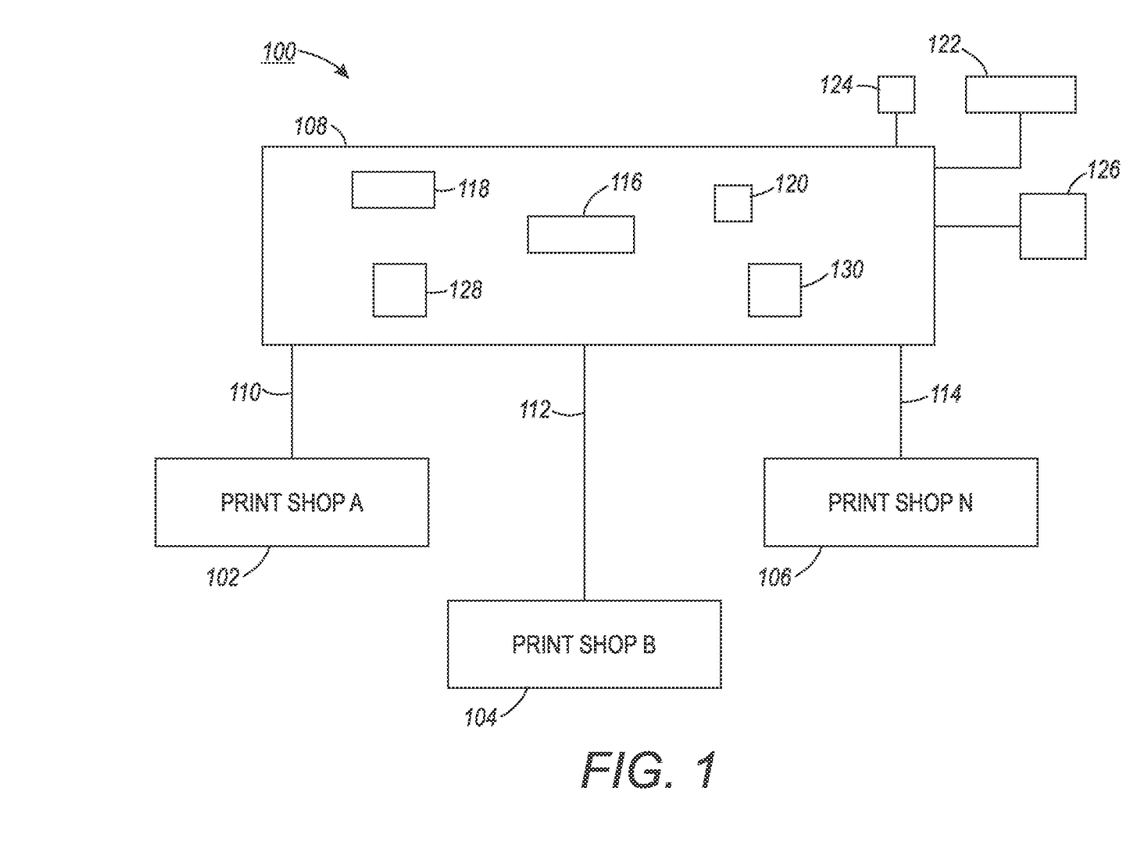
FIG. 1 is a system into which the presently described embodiments may be implemented.

Turning to FIG. 1, illustrated is a multi-site print shop environment 100 to which the concepts of the present application are directed. More particularly, a plurality of individual single-site print shops, including Print Shop A 102, Print Shop B 104 . . . Print Shop N 106, are in operational communication with a multi-site scheduler configuration 108.

The print shops may be geographically distant from each other and/or the multi-site scheduler 108. Communication lines 110, 112, 114 represent multiple types of communication connections, including communication via telephone lines, internet connections, wireless communication, among others. Also, while multi-site scheduler 108 is shown to be distanced from each of the print shops, in certain embodiments the multi-site scheduler 108 is physically co-located with one of the print shops. In other embodiments, multi-site scheduler 108 is a distributed configuration where portions are at different print shop locations, and/or there may be a parallel implementation of a plurality of multi-site scheduler configurations at a plurality of the print shops.

Multi-site scheduler 108 is configurable in a variety of arrangements and components. In one exemplary embodiment, it is designed as an electronic computational apparatus comprising an electronic processor 116, a main memory 118, an input/output controller 120, a keyboard and/or voice input device 122, a pointing device 124 (e.g., mouse, track ball, pen device, or the like), a display device 126 and a mass storage 128 (e.g., hard disk). Additional components, such as a rendering device 130, may be included as part of multi-site scheduler 108 as desired. In one embodiment, the components communicate with each other through a system bus or similar architecture.

Programs defining functions of the present application can be delivered to and/or implemented on multi-site scheduler 108 via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems.

The individual print shops (102, 104, 106) are provided with resources and equipment to produce print jobs. These resources and equipment may vary from shop to shop, in other words each print shop is not required to be identical to other ones of the print shops. At least some of the print shops are designed in a cellular type configuration and are operated in accordance with a cellular control.

Figure 2:
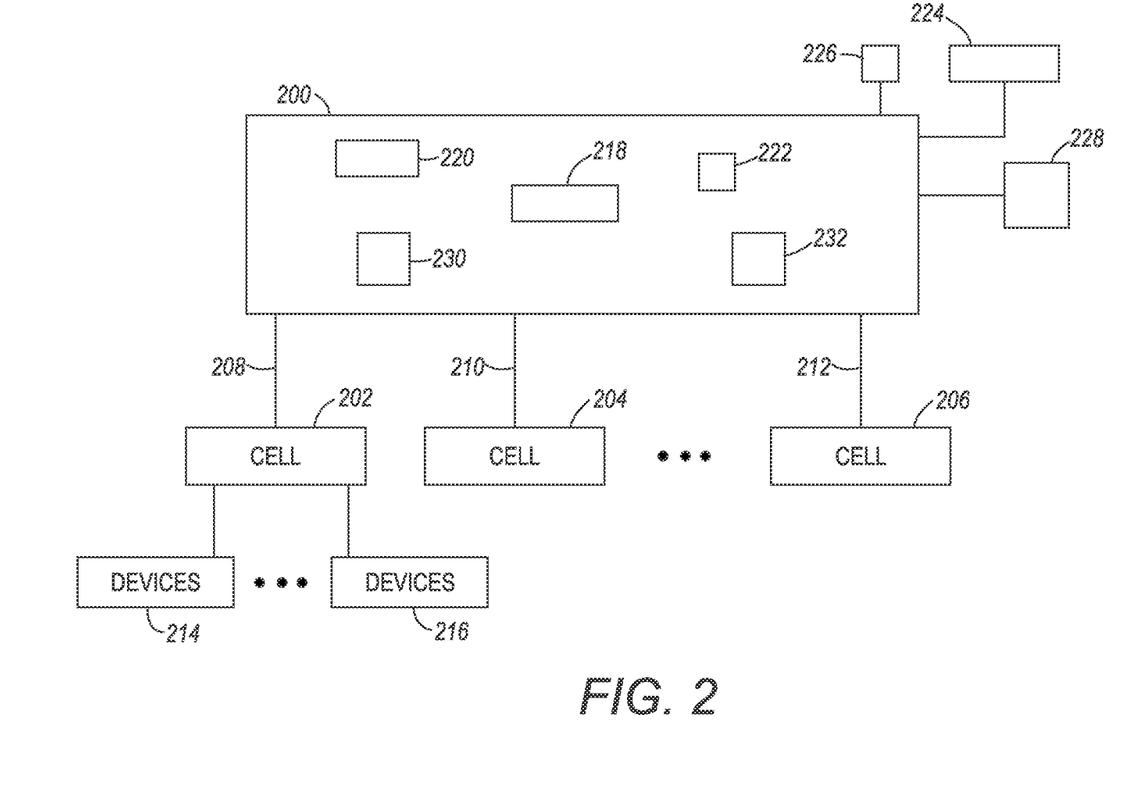
FIG. 2 is a system into which the presently described embodiments may be implemented.

As an example of a cellular print shop arrangement, attention is directed to FIG. 2 (which may be any of print shops 102, 104 or 106). Printing workflow system 200, which is in communication with multi-site scheduler 100 (e.g., via line one of communication lines 110, 112 or 114), controls a plurality of cells 202-206, and sends information to and receives information from cells 202-206 via communication links 208, 210 or 212. The cells 202-206 are comprised of at least one device for assisting in completing a document processing job of given product-types. For example, printing device 214 could be a 600 dpi monochrome printer, while printing device 216 could be a 1200 dpi color printer. These, of course, are only examples and many other processing devices may be included as part of a cell.

Printing workflow system 200 may be configured in a variety of embodiments, including as an electronic processing system (similar to the arrangement shown in FIG. 1), which includes an electronic processor 218, a main memory 220, an input/output controller 222, a keyboard and/or voice input device 224, a pointing device 226 (e.g., mouse, track ball, pen device, or the like), a display device 228 and a mass storage 230 (e.g., hard disk). Additional components, such as a rendering device 232, may be included as part of workflow system 200 as desired. In one embodiment, the components communicate with each other through a system bus or similar architecture. The workflow system 200 receives potential print jobs to be scheduled from multi-site scheduler 100 (FIG. 1). If the particular print job is to be undertaken, electronic processor 216 executes programming instructions to manage the actual document processing operations of the print job.

Figure 3:
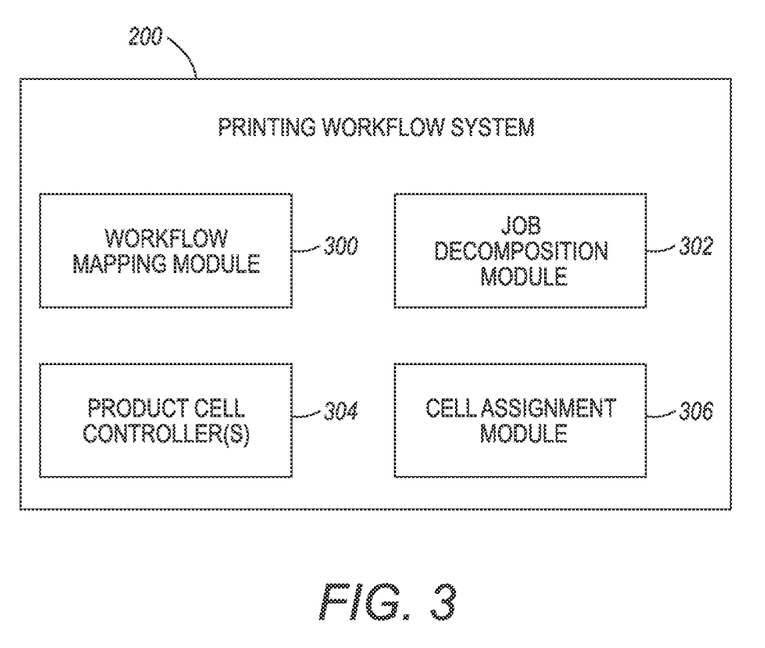
FIG. 3 is a system into which the presently described embodiments may be implemented.

To perform the document processing operations, the workflow system 200 is provided with processing modules 300-306 of FIG. 3 and other data which may be stored, for example, in main memory 220 and/or hard disk memory 230.

The processing modules more particularly include workflow mapping module 300 that determines the workflow for selected document processing jobs. The workflow module, among other things, identifies the operational steps needed to complete a document processing job, and the sequence in which these operational steps should be performed. A job decomposition module 302 is included for splitting the document processing jobs into batches or sub-jobs and for sending the batches to cells for completion. A product cell controller (PCC) 304 may be provided at given cells for receiving at least one batch to be processed by a device in the cell. Lastly, a cell assignment module 306 is provided for assigning batches to be processed by a cell.

With regard to the multi-site cellular system described in connection with FIGS. 1-3, providing a scheduling of print jobs that improves the overall efficiency of document production in the multi-site system is considered to be useful.

The presently described embodiments introduce a class of multi-site scheduling constraints that can be used to realistically model the tradeoff between resource sharing and the coordination overhead of outsourcing. The algorithm for handling such constraints that has lower computational complexity than previous algorithms.

According to the presently described embodiments, the multi-site scheduling constraints are implemented to give the shop owner fine-grained control over how jobs should be outsourced. In this regard, a simple example illustrates a typical issue that arises in many multi-site shops—certain jobs are more closely related than others. For example, monthly statements from the same bank are more closely related than those from another bank, and statements from the same bank do not have to all belong to the same job. In large print shops, it is very common to have hundreds of jobs from the same customer, and among these same-customer jobs, some are yet more closely related than others. However, such information is not currently modeled. This is not a significant issue for singlesite scheduling because when jobs are always produced by the same production site, knowing how they are related may not provide much additional value. However, in a multi-site environment, such information can be meaningful. For example, when the shop owner decides to outsource a subset of jobs, there is a natural tendency to group jobs with similar properties (e.g., from the same customer), and then outsource them as a group. This can significantly reduce the overhead of multi-site coordination. When a job is outsourced to another site, it would be a lot easier if similar jobs have already been outsourced to the same site before. Otherwise, the overhead of setting up a new type of outsourcing jobs can be quite expensive. As a result, it is often desirable to outsource jobs in groups rather than one by one. One-by-one outsourcing can lead to a situation called outsourcing fragmentation in which jobs are outsourced to so many different sites that the actual benefit goes negative.

To discourage "one-off" or one-by-one outsourcing activities, the presently described embodiments provide a class of scheduling constraints to allow for treatment of closely related jobs as an outsourcing group. In one form, it is considered an all-or-nothing constraint. If one job in an outsourcing group gets outsourced to a production site, then all the remaining jobs in the same group are outsourced to the same site. As a beneficial effect, this also helps to reduce the chance of error caused by different sites having different workflows or production protocols.

Using the outsourcing group constraints according to the presently described embodiments, users, e.g., shop owners, can group similar jobs together as a single outsourcing entity (using any criteria of their choice) and be assured that the all-or-nothing outsourcing constraint is enforced all the time. According to the presently described embodiments, the "OutsourcingGroup" attribute is used to denote the outsourcing group to which a job belongs. The example below shows the XML syntax used in an implementation:

```
<Attributes>
    <Attr Name="OutsourcingGroup" Value="BofA_statements">
    ...
</Attributes>
```

In the example above, jobs with the same <"OutsourcingGroup", BofA_statements"> name-value pair are put in the same group to form a single outsourcing entity. Next, the extension to the multi-site scheduling algorithm, in order to support this new scheduling constraint, is described.

Given the complexity of optimal job shop scheduling, which is computationally intractable, industrial-strength scheduling tools typically employ polynomial-time approximation schemes (PTAS) to quickly find good but not necessarily optimal schedules. Among the various PTAS used in the literature, the most popular one adopts the one-job-at-a-time strategy to avoid the combinatorial explosion inherent in job shop scheduling. Such a greedy strategy has proven very effective for numerous LDP scenarios, as well as in other cellular manufacturing settings. So, the challenge here is how to perform group-based scheduling using a scheduler that only schedules one job at a time.

Before describing the details of an algorithm according to the presently described embodiments, we first review the basics of our multi-site setup, in which jobs can typically be handled by more than one site (although this is not strictly required). To ensure job integrity, a job specifies its home shop, which is guaranteed to have all the necessary equipment and resources to complete the job (otherwise an error is reported). However, if a job cannot be processed by a non-home shop, this is considered acceptable in multi-site scheduling, because individual shops may have unique equipment that is not present in other shops, and thus it is OK to have jobs that can be handled by only one or few shops.

To keep track of which job can be outsourced to which shop, the presently described embodiments maintain a job database that maps each individual job to the list of eligible shops that have the necessary means (e.g., equipment and personnel) to successfully complete the job. For any given job, such a list cannot be empty, because at least one of the shops in the enterprise will be able to process the job successfully. Otherwise, the enterprise will reject the job. However, to consider a group of jobs as a single outsourcing entity, one must compute the eligible shops for the entire group instead of individual jobs. To do so, the presently described embodiments compute the intersection of eligible shops of all jobs in the same group. For example, if jobs $j_1$ and $j_2$ both belong to the same group: $j_1$ can be produced in shops $\{s_1, s_2\}$; whereas $j_2$ can be produced in shops $\{s_2, s_3\}$, then the eligible shops for the job group $\{j_1, j_2\}$ is the set $\{s_1, s_2\} \cap \{s_2, s_3\} = \{s_2\}$. Formally, let $j_i \in J$ be the set of jobs in a group and $S_{ji}$ be the set of eligible shops for then $j_i$, then $S_J$, the set of eligible shops for the entire job group J, is $$S_J = \bigcap_{j_i \in J} S_{ji}$$

Let S be the set of single-site shops considered in a multi-site setup. Let J be the set of jobs, of which $J_{os}$ is the set of outsourceable jobs and $J_{no}$ is the set of non-outsourceable jobs. Let $D(s_i, s_j)$ be the inter-shop delay from shop $s_i \in S$ to shop $s_j \in S$. Let function home-shop(j) return the home shop of job $j \in J$ and function can-handle(s, j) return true if shop s can successfully complete job j. Let $g \in G$ be the set of outsourcing groups. Furthermore, let function group(j) return (the id of) the group to which job j belongs, and let function eligible-shops(g) return the set of shops that can complete all jobs in group g. According to the presently described embodiments, the following functions are implemented:

```
1.  foreach shop s ∈ S do                                          /* schedule non-outsourceable jobs */
      a.   J_no(s) ← {j ∈ J_no | home-shop(j) = s }
      b.   Schedule all jobs j ∈ J_no(s) in shop s
      c.   Record resource allocations (e.g., equipment, operators, consumables, etc.) in R_s
2.  foreach outsourcing group g ∈ G do
      a.   eligible-shops(g) ← S                                   /* initialize eligible shops for group g */
      b.   best-shop(g) ← ⊥                                        /* initialize best shop for group g */
3.  foreach outsourceable job j ∈ J_os do                          /* compute eligible shops for job groups */
      a.   S' ← { s' ∈ S | can-handle(s', j) = true }              /* set of eligible shops for j */
      b.   g ← group(j)
      c.   eligible-shops(g) ← eligible-shops(g) ∩ S'              /* prune ineligible shops */
4.  foreach outsourceable job j ∈ J_os do
      a.   s ← home-shop(j)
      b.   g ← group(j)
      c.   if best-shop(g) = ⊥ then best-shop(g) ← select-best-shop(g)
      d.   s* ← best-shop(g)
      e.   Schedule job j in shop s* subject to resource constraints R_s*
      f.   t_s* ← finish time of job j in shop s*
      g.   If s* ≠ s then t_s* ← t_s* +D(s*,s)                     /* add transportation delay to home shop s */
      h.   r_s* ← resource allocation made for job j in shop s*
      i.   R_s* ← R_s* ∪ { r_s*}                                   /* commit resource allocation in best shop */
      j.   if s ≠ s* then O_s ← O_s ∪ {j}   /* optional step to update set of outsourced jobs for s */
```

The above relies on the "select-best-shop" function to narrow down the set of eligible shops to a single shop. The select-best-shop function works as follows.

function select-best-shop(g)

Input: outsourcing group g

```
Output: best shop s*
1.  J_s ← Select a subset of jobs ∈ g
2.  S ← eligible-shops(g)
3.  foreach shop s ∈ S do
       a.  R'_s ← R_s              /* make a temporary copy of resource allocations for shop s */
       b.  t_s^max ← -∞             /* initialize the latest job finish time for shop s */
       c.  foreach job j ∈ J_s do
              i.    s_0 ← home-shop(j)
              ii.   Schedule job j in shop s subject to resource constraints R'_s
              iii.  t_s ← finish time of job j in shop s
              iv.   if s ≠ s_0 then t_s ← t_s +D(s, s_0)       /* add transportation delay to home shop s_0 */
              v.    if t_s^max < t_s then t_s^max ← t_s    /* keep track of the latest job finish time for shop s */
              vi.   r_s ← resource allocations made for job j in shop s
              vii.  R'_s ← R'_s ∪ { r_s }                /* reserve resources allocated for job j in shop s */
4.  s* ← argmin_{s∈S} {t_s^max}        /* find shop with the earliest finish time for the latest jobs */
5.  return s*                        /* return shop s* as the best shop */
```

According to the select-best-shop function, a (representative) subset of jobs from an outsourcing group is chosen, chosen jobs in each of the eligible shops are scheduled, and the finish time for the latest job in each shop is recorded. The best shop is the one that has the earliest finish time for the latest job. The select-best-shop function uses a mini-max strategy to ensure that the shop selected is the "overall" best shop for the entire group. For improved efficiency, the algorithm only attempts to schedule a subset of jobs for the eligible shops, as long as the subset is sufficiently large or otherwise representative enough to distinguish the good shops from the bad ones.

Figure 4:
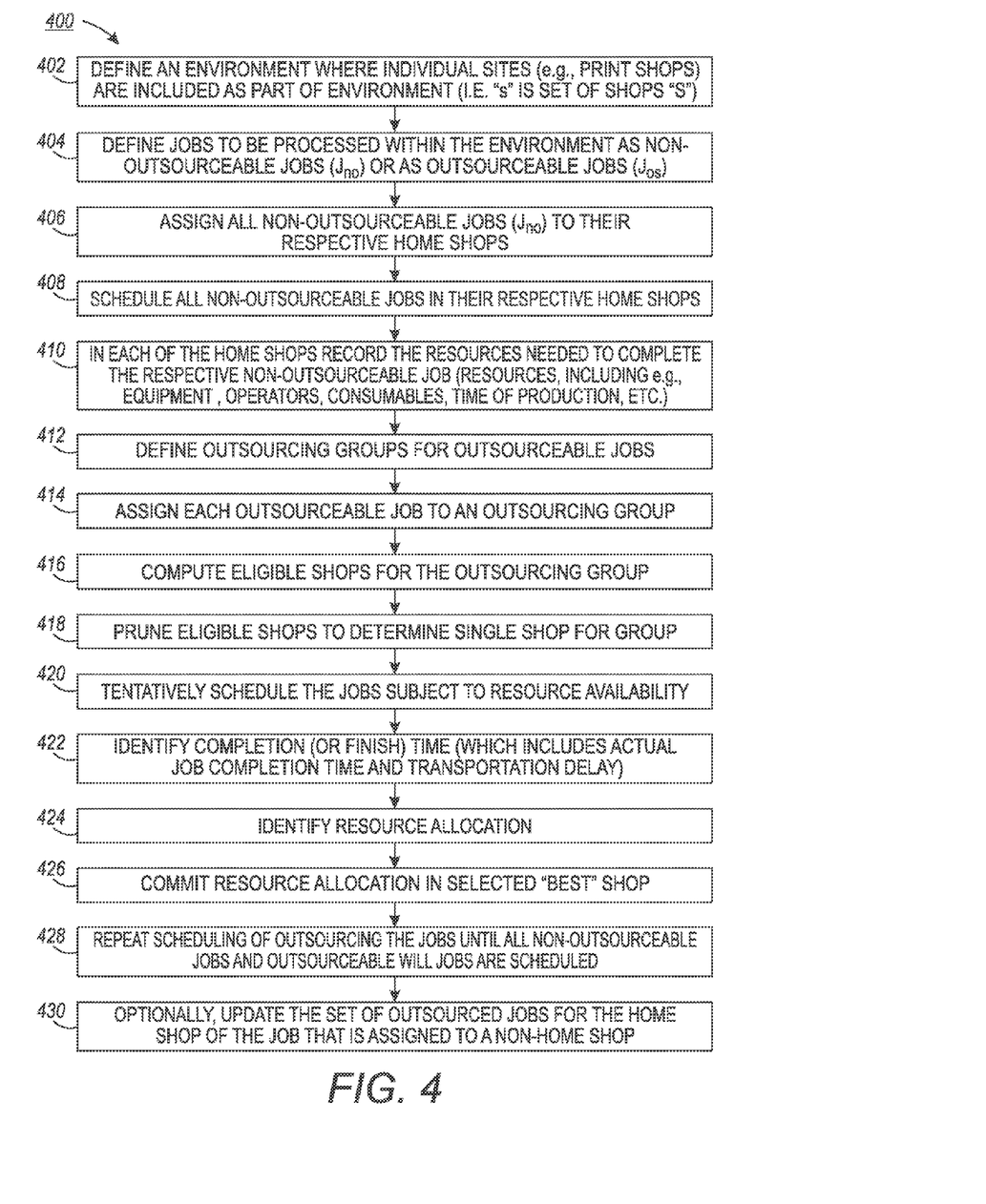
FIG. 4 is a flow chart according to the presently described embodiments.

Turning now to FIG. 4, a discussion of the above algorithm is expanded upon in connection with flow diagram 400. It should be appreciated that the techniques of the flow diagram 400 (as well as the other descriptions herein including the functions described above) may be implemented using a variety of software techniques and/or hardware configurations. For example, the multi-site scheduler 108 may be used to implement the technique and/or execute routines to accomplish the contemplated functions. Other resources described herein, as well as other suitable resources, may also be used.

Initially, referring back to FIG. 4, an environment where individual sites (e.g., print shops) which are to be included as part of the environment are defined 402. Jobs (e.g. print jobs), which are to be processed within the defined environment are then identified to be non-outsourceable ($J_{no}$) or outsourceable jobs ($J_{os}$) 404. Particularly, the system may automatically identify if other print shops have the resources and equipment to handle the print jobs, and then will identify the print jobs accordingly. Also, rules may be included which may exclude a print shop for some reason, even if all resources and equipment are available in a print shop. Also, a user may be given authority to identify particular print jobs as outsourceable or non-outsourceable. Next, all non-outsourceable jobs are assigned to their respective home shops 406. Thereafter, a schedule is generated for all non-outsourceable jobs, each within their own particular home shop 408. Based on the generated schedules, each of the home shops will record the resources needed to complete the scheduled non-outsourceable jobs. Resources here include such things as the equipment, operators, consumables, etc. necessary to complete the job 410. At this point in the process, all non-outsourceable jobs have been scheduled and the resources which will be consumed to produce those jobs according to the schedule had been recorded.

The process next defines outsourcing groups (g) for outsourceable jobs 412, and each outsourceable job is assigned to a specific outsourcing group 414.

Next, the eligible shops for the outsourcing groups are determined 416. From the eligible shops, a single best shop is determined (i.e., the eligible shops are pruned) for any particular outsourcing group using the above-noted select-best-shop function 418. Next, a tentative schedule is generated subject to resource availability 420.

The time to complete each of the outsourceable jobs in each of the non-home shops is identified and stored 422. It is understood that the completion time for an outsourceable job scheduled in a non-home shop will include the job completion time and any transportation delay, such as the time needed to ship the completed job to the home shop. Thus, the completion time for a non-home shop is different from the completion time of the home shop as the home shop does not further include the transportation delay.

At this point, resource allocation is identified 424. The resource allocation is then committed 426. This process is repeated for all outsourced jobs until all the outsourced jobs are finally scheduled 428. At this point the scheduling operations may be considered as completed. However, optionally, if the print job is outsourced, its home shop may add the job to its set of outsourced jobs 430.

It should be appreciated that the flow design 400 (and/or other functions described herein) may be implemented in parallel manner. A suitably configured parallel system of multi-site scheduling will improve system performance.

In the following, we show that even in the worst case where the chosen subset of jobs is the entire group, the complexity of our new algorithm is still linear in the number of shops and in the number of outsourceable jobs.

Let $C_i$ be the time complexity of scheduling i number of jobs in a single-site shop. Assuming each shop gets its fair share of non-outsourceable jobs, it can be shown Step 1 of the main algorithm has the time complexity of $$O\left(|S| \times C_{\frac{|J_{no}|}{|S|}}\right)$$

where $|S|$ is the number of shops and $|J_{no}|$ is the total number of non-outsourceable jobs. The complexity of Steps 2 and 3 is dominated by the complexity of Step 4 of the main algorithm, which is $O(|S| \times |J_{os}| \times C_1)$, where $|J_{os}|$ is the total number of outsourceable jobs. The overall time complexity depends on whether Step 1 dominates Step 4 or not. If scheduling $|J_{no}|/|S|$ jobs in a single-site shop is more expensive than scheduling a single job in a single-site shop $|J_{os}|$ times, then Step 1 becomes the dominating factor and the complexity of the multi-site scheduling algorithm is the same as the complexity of a single-site scheduling algorithm with $|J_{no}|$ number of jobs; otherwise Step 4 is the dominating factor, which makes the complexity of the multi-site scheduling algorithm a factor of $|S|$ more expensive than the single-site algorithm, assuming $|J_{no}|$ and $|J_{os}|$ are comparable.

Since $C_i$ is roughly $i \times C_1$ (i.e., the complexity of scheduling i jobs is roughly the same as scheduling a single job i times), we can simplify the overall complexity as $O(|J_{no}| \times C_1 + |S| \times |J_{os}| \times C_1)$, which can be further reduced to $O(|S| \times |J_{os}|)$, if $|J_{no}| = O(|J_{os}|)$ and $C_1 = O(1)$. This gives us the intuitive result that the complexity of the multi-site algorithm is linear in the number of shops as well as in the number of outsourceable jobs, in the worst case when select-best-shop chooses the whole group as its test set.

In the best/average case where only a constant number of jobs is chosen by the select-best-shop function, the complexity becomes $O(|J_{os}|)$, which is improved over previous results. The intuitive explanation is that if the algorithm picks the best shop based on sampling a constant number of jobs, then the complexity of select-best-shop is only $O(|J_{os}|)$ and so is the complexity of step 4 of the main algorithm, making the overall complexity of multi-site scheduling comparable to the complexity of single-site scheduling.

The above multi-site scheduling algorithm with outsourcing group constraints are implemented and available in a variety of ways, including in C++ and in a JNI interface for the Java-based LDP toolkit. The executable programs can run on a variety of platforms including both Windows and Linux. The multi-site scheduler may also be provided as a DLL on Windows and the same DLL handles both single and multi-site scheduling scenarios. An advantage of this implementation is that it does not run out of memory on the largest LDP shops or job lists. The presently described embodiments naturally extend all the benefits of a single-site scheduler to the multi-site case without exceptions, including speed, quality, and scalability. In addition, advanced features (e.g., intelligent batching with Auto-Splitting and the same-function-sequence-on-same-machine guarantee) are available for use in the multi-site case. Thus, there is no loss of functionality in going from single to multi-site scheduling with this implementation. Besides, the syntax for expressing group constraints is fully compatible with previous versions of the LDP scheduler.

A significant advantage of this technique is, of course, the ability to perform more realistic multi-site scheduling with the newly introduced outsourcing group constraints. As an appealing additional effect, the new algorithm is computationally more efficient than prior systems, because finding the best outsourcing shop using sampling is more efficient than an exhaustive enumeration of all the jobs in a group.

To demonstrate the efficiency of the new algorithm, the following experiments were constructed. The multi-site environment contains two sites in the experiment. We varied the inter-shop delay between 6 and 72 hours and recorded various performance metrics of the multi-site scheduler. The total number of outsourceable jobs is 1089 and the number of non-outsourceable jobs is 362, for a total of 1451 jobs.

Figure 5:
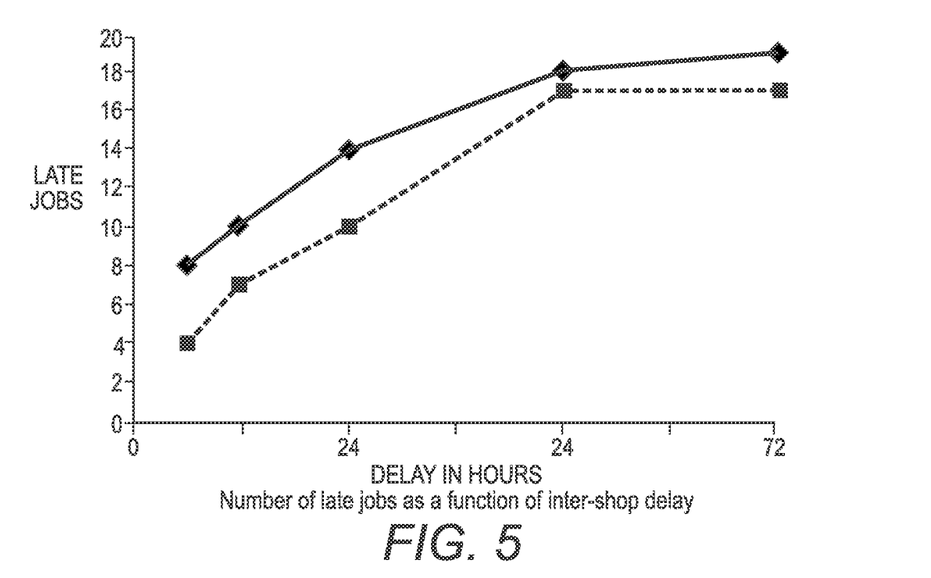
FIG. 5 shows experimental results.

The first performance metric collected is the number of late jobs, which increases as the intershop delay between these two shops gets bigger and bigger. But even with a delay of 3 days (i.e., 72 hours on x-axis of FIG. 5), there are only 19 late jobs, which accounts for 1.3% of the total of 1451 jobs. For comparison, the total number of late jobs would become 424, if the two shops were considered in isolation of one another. FIG. 5 compares the new algorithm with the previous multi-site scheduling algorithm that does not support outsourcing groups. Because having outsourcing groups constrains the space of possible outsourcing policies, schedules found without such constraints can have fewer late jobs than the ones found with the constraints, even though the latter ones are much more practical to implement. According to FIG. 5, only a few jobs are delayed due to the outsourcing group constraints.

Figure 6:
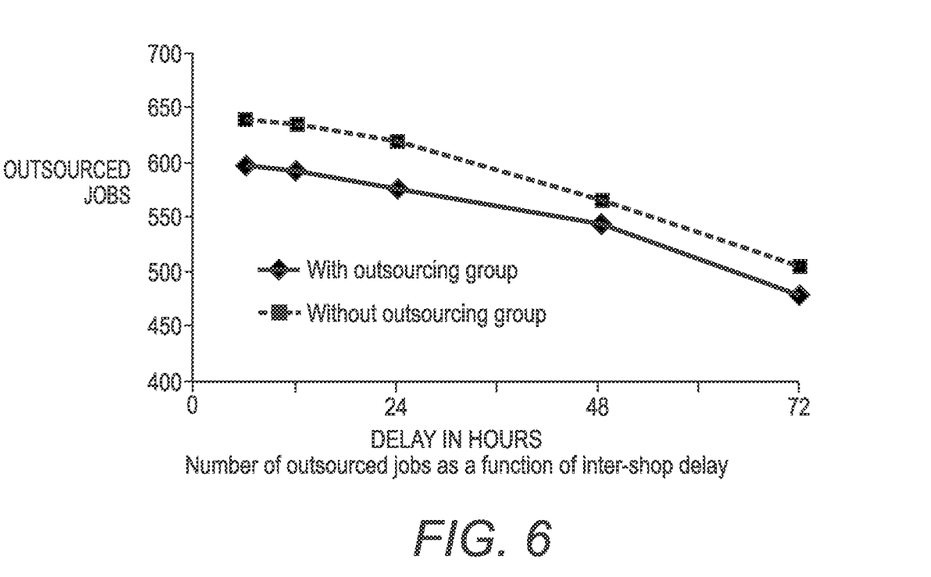
FIG. 6 shows experimental results.

Next, we considered the effect of inter-shop delay on the number of outsourced jobs. FIG. 6 shows, as the delay gets bigger, fewer jobs get outsourced. However, the one without the outsourcing group constraints has more jobs outsourced than the one with those constraints. On average, the group constraints reduce the number of outsourced jobs by 34, without significantly affecting the quality of the schedules found. In the meantime, having fewer outsourced jobs saves transportation cost and reduces multi-site coordination overhead.

We also compared the runtime of both multi-site scheduling algorithms. The previous algorithm completed the scheduling task in about 1.7 seconds on a 2 GHz Xeon E5405 processor (with no multithreading). On the same machine, the new algorithm took about 1.45 seconds to complete. Note that the single-site scheduler would take about 1.3 seconds to schedule both shops separately. Thus, the computational overhead of the new algorithm is closer to single-site scheduling than the old algorithm, and this advantage will increase as the number of participating shops grows in a multi-site environment.

T Example variations of the embodiments are described below.

First, the select-best-shop function can use alternative criteria to determine the "best" shop. For example, instead of choosing the shop that finishes the last job the soonest, it can favor the shop with the minimum average turn-around-time (TAT) or some variations of efficiency measure.

Second, in situations where no obvious logical grouping of outsourceable jobs is available, one can create artificial outsourcing groups, just for the sake of saving some computation, because the new algorithm has lower complexity than the original algorithm for multi-site scheduling. In this case, the algorithm can put jobs with similar sizes or due dates in the same group, instead of jobs from the same customer.

Third, the same sampling strategy can be used in single-site scheduling to find the best cell for processing certain jobs. If the cells in single-site scheduling are viewed as the "shops" in multi-site scheduling, then the same technique to reduce the complexity of the latter can be easily adapted for the former.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for managing scheduling of a plurality of jobs in a multi-site shop environment comprising:
   a plurality of shops having resources and equipment to complete at least one type of job;
   a multi-site scheduler, comprising at least a processor and a memory, configured to assign and schedule jobs to one of a home shop or a non-home shop, assignments to non-home shops based on an all-or-nothing outsourcing group constraint and a computation of eligible shops for an entire group of jobs resulting in a logical grouping of outsourceable jobs wherein all jobs in the same group have similar properties and receive the same outsourcing treatment such that, if one job in the logical grouping of outsourceable jobs is outsourced to a site, all remaining jobs in the same group are outsourced to the same site; and, equipment to produce the plurality of jobs at the same site.

2. The system as set forth in claim 1 wherein a best shop for the logical grouping is determined based on completion time.

3. The system according to claim 1, wherein the multi-site scheduler is comprised of a plurality of parallel implementations of the multi-site scheduler.

4. A method for managing a scheduling of a plurality of print jobs in a multi-site print shop environment comprising:

defining a plurality of print shops having resources and equipment to complete at least one type of print job as part of a multi-site printing environment;

configuring a multi-site scheduler, comprising at least a processor and a memory, to assign and schedule print jobs to one of a home shop and a non-home shop, assignments to non-home shops based on an all-or-nothing outsourcing group constraint and a computation of eligible shops for an entire group of jobs resulting in a logical grouping of outsourceable jobs wherein all jobs in the same group have similar properties and receive the same outsourcing treatment such that, if one job in the logical grouping of outsourceable jobs is outsourced to a site, all remaining jobs in the same group are outsourced to the same site; and executing instructions to manage document processing operations of the plurality of print jobs at the site.

5. The method as set forth in claim 4 wherein a best shop for the logical grouping is determined based on completion time.

6. The method according to claim 4, further including implementing the multi-site scheduler as a plurality of parallel implemented multi-site schedulers.

7. A method of scheduling jobs in shops in a multi-site shop environment including a scheduler comprising at least a processor and a memory to execute the method, the method comprising:

defining a multi-site environment to include a plurality of individual shops as part of the multi-site environment;

defining jobs to be processed within the multi-site environment as non-outsourceable jobs or as outsourceable jobs;

assigning non-outsourceable jobs to their respective home shops;

scheduling non-outsourceable jobs in their respectively assigned home shops;

recording the resources needed to complete the respective non-outsourceable jobs in each of the home shops;

determining outsourcing groups for the outsourceable jobs;

assigning each outsourceable job to an outsourcing group based on an all-or-nothing outsourcing group constraint wherein all jobs in the same group have similar properties and are to receive the same outsourcing treatment such that, if one job in the logical grouping of outsourceable jobs is outsourced to a site, all remaining jobs in the same group are outsourced to the same site;

determining eligible shops for the outsourcing groups;

pruning the eligible shops to determine a best shop for any one outsourcing group;

tentatively scheduling the outsourceable jobs subject to resource availability;

identifying a completion time for the outsourceable jobs tentatively scheduled in the non-home shops and the resource allocation to complete the outsourceable jobs; and formalizing scheduling and resource allocation to complete the lobs.

8. A system for managing scheduling of a plurality of jobs in a multi-site shop environment comprising:

a multi-site scheduler, comprising at least a processor and a memory, configured to assign and schedule jobs to be completed by devices to one of a home shop or a non-home shop, assignments to non-home shops based on an all-or-nothing outsourcing group constraint and a computation of eligible shops for an entire group of jobs resulting in a logical grouping of outsourceable jobs wherein all jobs in the same group have similar properties and receive the same outsourcing treatment such that, if one job in the logical grouping of outsourceable jobs is outsourced to a site, all remaining jobs in the same group are outsourced to the same site.

9. The system as set forth in claim 8 wherein a best shop for the logical grouping is determined based on completion time.

10. The system according to claim 8, wherein the multi-site scheduler is comprised of a plurality of parallel implementations of the multi-site scheduler.

11. The system as set forth in claim 1 wherein the equipment comprises at least one printing or rendering device to complete the jobs.

12. The system as set forth in claim 8 wherein the multi-site scheduler assigns and schedules jobs to be completed by printing or rendering devices.

13. The method as set forth in claim 4 wherein the multi-site scheduler assigns and schedules print jobs to be completed by printing or rendering devices.

14. The method as set forth in claim 7 wherein the formalizing scheduling and resource allocation results in completing jobs using printing or rendering devices.

15. A non-transitory computer readable medium containing program instructions for causing a computer to perform a method of managing scheduling of a plurality of jobs in a multi-site shop environment comprising assigning and scheduling print jobs to one of a home shop or a non-home shop, assignments to non-home shops based on an all-or-nothing outsourcing group constraint and a computation of eligible shops for an entire group of jobs resulting in a logical grouping of outsourceable jobs wherein all jobs in the same group have similar properties and receive the same outsourcing treatment such that, if one job in the logical grouping of outsourceable jobs is outsourced to a site, all remaining jobs in the same group are outsourced to the same site for completion by printing or rendering devices at the same site.

* * * * *